(12) United States Patent
Fuchs et al.

(10) Patent No.: US 11,814,034 B2
(45) Date of Patent: Nov. 14, 2023

(54) DEVICE FOR CONTROLLING A DRIVE-ENERGY SYSTEM OF A HYBRID OR ELECTRIC VEHICLE, HYBRID OR ELECTRIC VEHICLE, AND METHOD FOR CONTROLLING A DRIVE-ENERGY SYSTEM OF A HYBRID OR ELECTRIC VEHICLE

(71) Applicant: Bayerische Motoren Werke Aktiengesellschaft, Munich (DE)

(72) Inventors: Simone Fuchs, Munich (DE); Harald Hofmeier, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 546 days.

(21) Appl. No.: 16/972,136

(22) PCT Filed: May 28, 2019

(86) PCT No.: PCT/EP2019/063859
§ 371 (c)(1),
(2) Date: Dec. 4, 2020

(87) PCT Pub. No.: WO2019/233832
PCT Pub. Date: Dec. 12, 2019

(65) Prior Publication Data
US 2021/0237712 A1    Aug. 5, 2021

(30) Foreign Application Priority Data

Jun. 7, 2018   (DE) .................. 10 2018 209 069.6

(51) Int. Cl.
*B60W 20/17*   (2016.01)
*B60W 10/30*   (2006.01)
(Continued)

(52) U.S. Cl.
CPC ......... *B60W 20/17* (2016.01); *B60H 1/00385* (2013.01); *B60W 10/30* (2013.01);
(Continued)

(58) Field of Classification Search
CPC ...... B60W 20/17; B60W 10/30; B60W 40/02; B60W 40/08; H01M 10/613;
(Continued)

(56) References Cited

U.S. PATENT DOCUMENTS

2006/0080986 A1    4/2006  Inoue
2009/0133859 A1    5/2009  Suzuki et al.
(Continued)

FOREIGN PATENT DOCUMENTS

| CN | 104002745 A | 8/2014 |
|---|---|---|
| CN | 106114509 A | 11/2016 |

(Continued)

OTHER PUBLICATIONS

Chinese-language Office Action issued in Chinese Application No. 201980037128.6 dated Sep. 27, 2022 with English translation (20 pages).

(Continued)

*Primary Examiner* — Mathew Franklin Gordon
(74) *Attorney, Agent, or Firm* — Crowell & Moring LLP

(57) ABSTRACT

A device for controlling a drive energy system of a hybrid or electric vehicle, a hybrid or electric vehicle having the same and a method for controlling a drive energy system of a hybrid or electric vehicle and noise emission control of a drive energy system of the hybrid or electric vehicle are provided.

10 Claims, 2 Drawing Sheets

(51) Int. Cl.
*H01M 10/613* (2014.01)
*H01M 10/625* (2014.01)
*H01M 10/6564* (2014.01)
*B60H 1/00* (2006.01)
*B60W 40/02* (2006.01)
*B60W 40/08* (2012.01)
*H01M 10/44* (2006.01)

(52) U.S. Cl.
CPC ............ *B60W 40/02* (2013.01); *B60W 40/08* (2013.01); *H01M 10/44* (2013.01); *H01M 10/613* (2015.04); *H01M 10/625* (2015.04); *H01M 10/6564* (2015.04); *B60H 2001/006* (2013.01); *H01M 2220/20* (2013.01)

(58) Field of Classification Search
CPC ........... H01M 10/625; H01M 10/6564; H01M 10/44; H01M 2220/20; B60H 1/00385; B60H 2001/006
See application file for complete search history.

(56) References Cited

U.S. PATENT DOCUMENTS

| | | |
|---|---|---|
| 2010/0241308 A1 | 9/2010 | Kikuchi et al. |
| 2014/0244106 A1 | 8/2014 | Singer et al. |
| 2016/0328976 A1 | 11/2016 | Jo et al. |
| 2017/0240058 A1 | 8/2017 | Ghebru et al. |

FOREIGN PATENT DOCUMENTS

| | | |
|---|---|---|
| CN | 107117044 A | 9/2017 |
| DE | 10 2015 223 223 A1 | 5/2017 |
| DE | 10 2016 202 807 A1 | 8/2017 |
| JP | 2007-22312 A | 2/2007 |

OTHER PUBLICATIONS

International Search Report (PCT/ISA/210) issued in PCT Application No. PCT/EP2019/063859 dated Aug. 12, 2019 with English translation (four (4) pages).

German-language Written Opinion (PCT/ISA/237) issued in PCT Application No. PCT/EP2019/063859 dated Aug. 12, 2019 (seven (7) pages).

German-language Search Report issued in German Application No. 10 2018 209 069.6 dated Jan. 8, 2019 with partial English translation (12 pages).

Chinese-language Office Action issued in Chinese Application No. 201980037128.6 dated May 24, 2023 with English translation (19 pages).

DEVICE FOR CONTROLLING A DRIVE-ENERGY SYSTEM OF A HYBRID OR ELECTRIC VEHICLE, HYBRID OR ELECTRIC VEHICLE, AND METHOD FOR CONTROLLING A DRIVE-ENERGY SYSTEM OF A HYBRID OR ELECTRIC VEHICLE

BACKGROUND AND SUMMARY OF THE INVENTION

The disclosure relates to a device for controlling a drive-energy system of a hybrid or electric vehicle, to a hybrid or electric vehicle with such a device, and to a method for controlling a drive-energy system of a hybrid or electric vehicle. The present disclosure relates, in particular, to the regulation of a noise emission of a drive-energy system of the hybrid or electric vehicle.

STATE OF THE ART

Hybrid or electric vehicles are driven by an electric motor, the necessary electrical energy being stored in a drive-energy storage device which may be a high-voltage storage device. The drive-energy storage device can be charged at a charging station in a house or at a special refueling point. In this connection, short charging-times are often an advantage for the user, in order that the hybrid or electric vehicle is quickly operational again. In the case of a so-called rapid charge, frequently the drive-energy storage device is charged only to about 80%. A rapid charge is an advantage for long-distance transportation, for instance, since the vehicles can be charged at high power in a short time. Particularly in the case of rapid charging, a cooling system of the hybrid or electric vehicle is operated at high power, in order to dissipate the heat arising in the drive-energy storage device during the charging process.

DISCLOSURE OF THE INVENTION

It is an object of the present disclosure to improve the operation of a drive-energy system of a hybrid or electric vehicle. In particular, it is an object of the present disclosure to make available a device for controlling a drive-energy system of a hybrid or electric vehicle, a hybrid or electric vehicle with such a device, and a method for controlling a drive-energy system of a hybrid or electric vehicle, which together are able to enhance driver comfort during a charging process.

This object is achieved by the subject-matter of the independent claims. Advantageous configurations are specified in the dependent claims.

According to one aspect of the present disclosure, a device is specified for controlling a drive-energy system of a hybrid or electric vehicle. The device comprises a detection device, which has been set up to determine a position of at least one person relative to the hybrid or electric vehicle, and a control device, which has been set up to control at least one component of the hybrid or electric vehicle. The control device has further been set up in order to adjust a noise emission of the at least one component on the basis of the determined position of the at least one person. The at least one component may be a component of the drive-energy system—such as, for instance, a refrigerant compressor and/or a fan for cooling a drive-energy storage device. However, the present disclosure is not limited thereto, and the at least one component may be a different component of the vehicle—such as, for instance, a refrigerant compressor and/or a fan of a system for cooling the passenger compartment.

In accordance with the invention, the noise emission or the loudness of the at least one component is adjusted in a manner depending on the position of the at least one person. In particular, the loudness in the course of charging can be limited in a manner depending on the position of the driver outside the vehicle. By this means, the occurrence of an unpleasantly noisy vehicle during charging can be avoided. The driver profits from a short charging-time, for instance by virtue of a high activation of the fan, and at the same time experiences a quiet, unobtrusive vehicle when he/she is within earshot. As a result, driver comfort during the charging process can be enhanced.

The noise emission or the loudness of the at least one component—such as, for instance, the refrigerant compressor and/or the fan—is preferentially adjusted by virtue of an adaptation of the power of the at least one component. Here, a higher power may mean a higher noise emission or loudness, and a lower power may mean a lower noise emission or loudness. The power can, for instance, be chosen in such a manner that the noise emission or loudness at a location defined with respect to the vehicle corresponds to a certain decibel value or lies below the latter.

The control device has typically been set up in order to adjust, and in particular to reduce, the noise emission of the at least one component during a process of charging the drive-energy storage device of the drive-energy system. In some embodiments, the charging process may be, for instance, a (DC) rapid-charging process. In the case of a rapid-charging process, the at least one component—such as the refrigerant compressor and/or the fan—can be operated at high power, in order to dissipate the heat arising in the drive-energy storage device during the charging process. The power of the at least one component can be chosen in such a manner that both a sufficient cooling of the drive-energy storage device occurs and the noise emission does not exceed a certain value.

The control device has preferentially been set up in order to reduce the noise emission or the loudness of the at least one component. For instance, the control device can reduce the noise emission of the at least one component if the detection device determines that the at least one person is staying in an interior space of the vehicle. The control device can reduce the noise emission of the at least one component, for instance by adapting the power, in such a manner that the loudness in the passenger compartment of the vehicle is equal to a limiting decibel value or less than the limiting decibel value. The limiting decibel value may be, for instance, 90 dB, 80 dB, 70 dB, 60 dB or 50 dB.

Additionally or alternatively, the control device can reduce the noise emission of the at least one component if the detection device determines that the at least one person is staying outside the hybrid or electric vehicle and within a predetermined distance from the hybrid or electric vehicle (or within a certain ambient region of the hybrid or electric vehicle). The predetermined distance may have been chosen in such a way that the reduced loudness within the region defined by the predetermined distance is equal to a limiting decibel value or less than the limiting decibel value. The limiting decibel value may be, for instance, 90 dB, 80 dB, 70 dB, 60 dB or 50 dB.

The device preferentially includes a database in which several values for the noise emission of the at least one component (and, in particular, several values for the noise emission of the entire drive-energy system) and corresponding operating parameters of the at least one component have been saved, for instance in a characteristic map. The database may, in particular, contain a correlation between the noise emission, and in particular the predetermined limiting decibel values, and the power and/or noise emission of the at least one component. Accordingly, for a predetermined limiting decibel value a corresponding power of the at least one component may have been saved in the database and can be used for the adjustment of the noise emission of the at least one component. For instance, measurements can be carried out within the scope of vehicle development, and a fixed data correlation of limiting dB value, limiting fan value and limiting value of the electromotive refrigerant compressor can be saved as a characteristic map in the vehicle.

In an optional embodiment, the device includes at least one noise-level sensor for measuring a loudness or a noise-level—such as a microphone, for instance. The at least one noise-level sensor can output the measured values to the control device, the control device being able to adjust the noise emission of the at least one component on the basis of the received measured values. In some embodiments, the noise-level sensor comprises a passenger-compartment sensor and/or an exterior-space sensor—such as, for instance, a passenger-compartment microphone and/or an exterior microphone. The passenger-compartment sensor may have been set up in order to measure the noise-level in the passenger compartment of the vehicle. The exterior-space sensor may have been set up in order to measure the noise-level outside the vehicle—such as, for instance, in the region defined by the predetermined distance.

In some embodiments, the detection device may have been set up in order to determine that the at least one person is moving away from the hybrid or electric vehicle if the at least one person stays in the passenger compartment of the hybrid or electric vehicle and/or within the predetermined distance from the hybrid or electric vehicle for less than a first predetermined period (for example, only briefly). Additionally or alternatively, the detection device may have been set up in order to determine that the at least one person is remaining with the hybrid or electric vehicle or in the vicinity of the hybrid or electric vehicle for longer (for example, for at least a certain time) if the at least one person stays in the passenger compartment of the hybrid or electric vehicle and/or within the predetermined distance from the hybrid or electric vehicle for more than a second predetermined period. The first predetermined period and the second predetermined period may be identical or different. The first predetermined period and/or the second predetermined period can be measured by means of a timer.

The detection device may preferentially have been set up in order to determine that the at least one person is remaining permanently with the hybrid or electric vehicle if the at least one person stays in the passenger compartment of the hybrid or electric vehicle and/or within the predetermined distance from the hybrid or electric vehicle for longer than a third predetermined period, which is longer than the second predetermined period. The control device may, for instance, have been set up in order not to limit or to reduce the noise emission of the at least one component if the detection device determines that the at least one person is remaining permanently with the hybrid or electric vehicle. For example, the noise emission of the at least one component can be limited at least in the time between the end of the second period (that is to say, if it is determined that the driver is remaining with the vehicle) and the end of the third period (that is to say, if it is determined that the driver is remaining permanently with the vehicle). Subsequently the limitation can be canceled, for instance after expiration of the third period, and charging can be effected "loudly", in order that an increase of the charging-time is minimized.

The first predetermined period and/or the second predetermined period and/or the third predetermined period can be measured by means of a timer. A starting-time may be the same for all periods.

In addition to or as an alternative to the third predetermined period, in some embodiments of the present disclosure the user or driver is able to set in a menu in the vehicle that he/she wishes to remain permanently with the vehicle. On the basis of this selection by the driver, the noise emission of the at least one component can then either be limited permanently or not limited.

The control device has typically been set up in order to reduce the noise emission of the at least one component if the detection device determines that the at least one person is remaining with the hybrid or electric vehicle or in the vicinity of the hybrid or electric vehicle. However, if the at least one person moves away from the hybrid or electric vehicle, no reduction of the noise emission can take place. For instance, in such a case the power of the refrigerant compressor and/or of the fan, and hence the noise emission, can even be increased, in order to conclude the charging process more quickly.

The detection device has preferentially been set up in order to determine the position of the at least one person on the basis of one or more aspects—such as, for instance, on the basis of a position of a car key; and/or a position of a mobile terminal of the at least one person, in particular a smartphone; and/or a distance of the at least one person from the hybrid or electric vehicle; and/or a position of the hybrid or electric vehicle; and/or a vehicle state, in particular a state of a central locking system of the hybrid or electric vehicle.

For instance, by searching for the key and/or for the mobile terminal it can be ascertained whether the driver is located inside or outside the vehicle. Additionally or alternatively, a distance of the driver from the vehicle can be ascertained by searching for the key and/or for the mobile terminal. In a further example, an evaluation of the position of the driver can be undertaken indirectly via a timer which, for instance, measures the first predetermined period and/or the second predetermined period, and/or via at least one vehicle state. In this way, the evaluation of the position of the driver can, for example, be undertaken on the basis of parking/residence/driving and the central locking system. If, for instance, the vehicle has been parked at the place of residence and the central locking system is locked, it can be inferred that the driver is not staying in the vicinity of the vehicle. However, if the vehicle has been parked at a refueling point away from the place of residence and if the central locking system is unlocked, it can be inferred that the driver is staying in the vicinity of the vehicle, and the noise emission can be reduced.

The detection device may include one or more sensors. The one or more sensors may, for instance, comprise a position sensor (for example, a GPS sensor for registering the position of the vehicle) and/or a distance sensor and/or a camera (for example, inside and/or outside). The distance sensor may have been set up to register a distance between the vehicle and the at least one person. The distance sensor may be, for instance, an ultrasonic sensor. In another example, the distance sensor can measure a signal strength of a signal received from a car key and can derive therefrom the distance from the car key or from the at least one person. Additionally or alternatively, the locating of the key can be undertaken via LF. The camera can record an image of the at least one person and determine the position of the at least one person relative to the vehicle by means of suitable software. In a further example, the detection device can receive position data pertaining to the mobile terminal—such as, for instance, a smartphone—in order to determine the position of the at least one person. Additionally or alternatively, the locating of the mobile terminal can be undertaken via UWB (ultra wideband).

According to a further aspect of the present disclosure, a hybrid or electric vehicle is specified. The hybrid or electric vehicle includes the device described above and the drive-energy system. The at least one component of the hybrid or electric vehicle may have been selected from the group that comprises a refrigerant compressor and a fan, for instance of the drive-energy system and/or of a system for cooling the passenger compartment. The drive-energy system may further include the drive-energy storage device. The drive-energy storage device can be cooled by the at least one component, for instance during a charging process.

The term "hybrid or electric vehicle" encompasses passenger cars, trucks, buses, camper vans, motorcycles, etc. which serve for the conveyance of passengers, goods, etc. In particular, the term encompasses motor vehicles for passenger transportation.

According to a yet further aspect of the present disclosure, a method is specified for controlling a drive-energy system of a hybrid or electric vehicle. The method comprises a determination of a position of at least one person relative to the hybrid or electric vehicle and a control of at least one component of the hybrid or electric vehicle in such a manner that a noise emission of the at least one component is reduced on the basis of the determined position of the at least one person. The method can be executed by the device for controlling a drive-energy system of a hybrid or electric vehicle according to the present disclosure.

BRIEF DESCRIPTION OF THE DRAWINGS

Exemplary embodiments of the disclosure are represented in the figures and will be described in more detail in the following. Shown are.

DETAILED DESCRIPTION OF THE DRAWINGS

Unless otherwise noted, identical reference symbols will be used in the following for identical and identically-acting elements.

Figure 1:
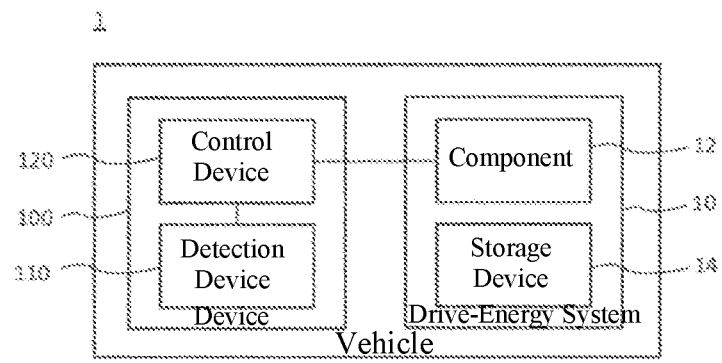
FIG. 1 schematically, a hybrid or electric vehicle with a device for controlling a drive-energy system according to embodiments of the present disclosure, FIG. 2 a hybrid or electric vehicle according to embodiments of the present disclosure, and FIG. 3 a flowchart of a method for controlling a drive-energy system of a hybrid or electric vehicle according to embodiments of the present disclosure.

FIG. 1 shows schematically a hybrid or electric vehicle 1 with a device 100 for controlling a drive-energy system 10 of the vehicle, according to embodiments of the present disclosure.

The hybrid or electric vehicle 1 includes the device 100, for controlling the drive-energy system 10, and the drive-energy system 10. The at least one component 12 may have been selected from the group that comprises a refrigerant compressor and a fan of the drive-energy system 10. The drive-energy system 10 may further include the drive-energy storage device 14 such as, for instance, a high-voltage storage device. The drive-energy storage device 14 can be cooled by the at least one component 12, for instance during a charging process.

The device 100 comprises a detection device 110, which has been set up to determine a position of at least one person relative to the hybrid or electric vehicle 1, and a control device 120, which has been set up to control the at least one component 12. The control device 120 has further been set up in order to adjust a noise emission of the at least one component 12 on the basis of the determined position of the at least one person. The device 100 can limit the noise emission or the loudness of the at least one component 12 in a manner depending on the position of the at least one person—such as the driver, for instance—as a result of which driver comfort can be enhanced.

The device 100 preferentially includes at least one noise-level sensor for measuring a loudness or a noise-level. The at least one noise-level sensor may be a microphone. The at least one noise-level sensor can output the measured values to the control device 110, the control device 110 being able to adjust, and in particular to reduce, the noise emission of the at least one component 12 on the basis of the received measured values.

Figure 2:
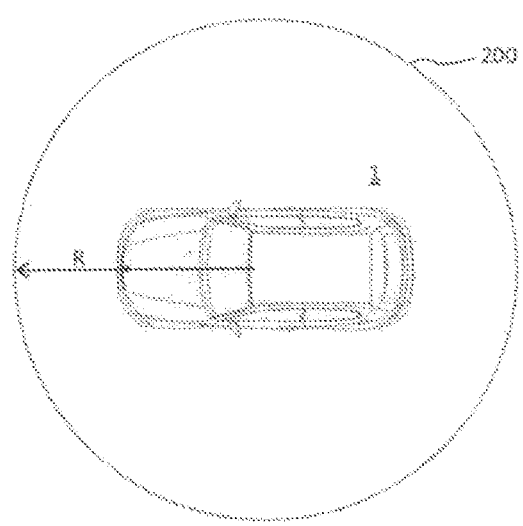

FIG. 2 shows a hybrid or electric vehicle 1 according to embodiments of the present disclosure.

The device of the present disclosure may have been set up in order to determine whether the at least one person is staying inside or outside the hybrid or electric vehicle 1. For instance, the control device can reduce the noise emission of the at least one component if the detection device determines that the at least one person is staying in an interior space of the vehicle. The control device can typically adjust the noise emission of the at least one component in such a manner that the noise-level in the passenger compartment of the vehicle, caused by the at least one component, does not exceed a limiting decibel value. The limiting decibel value may be, for instance, 90 dB, 80 dB, 70 dB, 60 dB or 50 dB.

Additionally or alternatively, the control device can adjust, and in particular reduce, the noise emission of the at least one component if the detection device determines that the at least one person is staying outside the hybrid or electric vehicle and within a predetermined distance from the hybrid or electric vehicle 1. The predetermined distance has been represented in FIG. 2 as a radius R around the hybrid or electric vehicle 1. The radius R may define an ambient region 200 of the hybrid or electric vehicle 1.

The control device can typically adjust the noise emission of the at least one component in such a manner that the noise-level in the ambient region 200, caused by the at least one component, does not exceed a limiting decibel value. The limiting decibel value may be, for instance, 90 dB, 80 dB, 70 dB, 60 dB or 50 dB.

In some embodiments, the detection device may have been set up in order to determine that the at least one person is moving away from the hybrid or electric vehicle if the at least one person stays in the passenger compartment of the hybrid or electric vehicle and/or within the ambient region 200 of the hybrid or electric vehicle 1 for less than a first predetermined period. Additionally or alternatively, the detection device may have been set up in order to determine that the at least one person is remaining with the hybrid or electric vehicle or in the vicinity of the hybrid or electric vehicle if the at least one person stays in the passenger compartment of the hybrid or electric vehicle and/or within the ambient region of the hybrid or electric vehicle 1 for longer than a second predetermined period. The length of stay of the at least one person in the passenger compartment and/or in the ambient region 200 can be measured, for instance by means of a timer.

The control device has typically been set up in order to reduce the noise emission of the at least one component if the detection device determines that the at least one person is remaining with the hybrid or electric vehicle or in the vicinity of the hybrid or electric vehicle (for example, in the ambient region 200). However, if the at least one person moves away from the hybrid or electric vehicle or out of the ambient region 200, no reduction of the noise emission can take place. For instance, in such a case the power of the refrigerant compressor and/or of the fan, and hence the noise emission, can even be increased, in order to conclude the charging process more quickly.

The detection device has preferentially been set up in order to determine the position of the at least one person on the basis of one or more aspects—such as, for instance, on the basis of a position of a car key; and/or a position of a mobile terminal of the at least one person, in particular a smartphone; and/or a distance of the at least one person from the hybrid or electric vehicle 1; and/or a position of the hybrid or electric vehicle 1; and/or a vehicle state, in particular a state of a central locking system of the hybrid or electric vehicle 1.

In some embodiments, the aforementioned aspects can be used individually or in combination in order to determine whether the at least one person is staying within the ambient region 200 or not. For instance, by searching for the key and/or for the mobile terminal it can be ascertained whether the driver is staying in the ambient region 200 and/or whether the driver is moving out of the ambient region 200.

The mobile terminal may have been communicatively connected to the hybrid or electric vehicle 1 and in particular to the detection device. The mobile terminal can communicate with the hybrid or electric vehicle 1 directly in wireless or wire-bound manner, or indirectly in wireless manner via a server link (for example, the cloud). The term "mobile terminal" implies, in particular, smartphones, but also other mobile phones or cell phones, personal digital assistants (PDAs), tablet PCs and also all electronic devices that are equipped with a technology for loading and executing apps.

Figure 3:
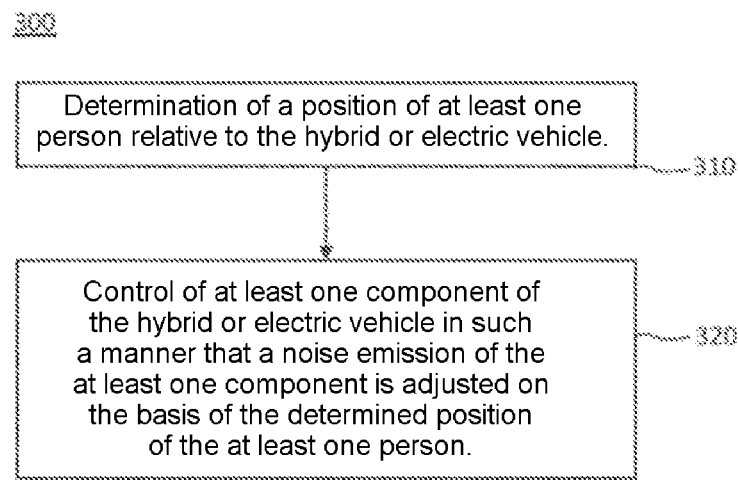

FIG. 3 shows a flowchart of a method 300 for controlling a drive-energy system of a hybrid or electric vehicle according to embodiments of the present disclosure. The method 300 can be executed by the device for controlling a drive-energy system of a hybrid or electric vehicle according to the present disclosure.

The method 300 comprises a determination, in block 310, of a position of at least one person relative to the hybrid or electric vehicle and a control, in block 320, of at least one component of the hybrid or electric vehicle in such a manner that a noise emission of the at least one component is adjusted, and in particular reduced, on the basis of the determined position of the at least one person. For instance, in the case where the driver stays in the passenger compartment and/or in the neighborhood outside the vehicle the loudness of the at least one component can be limited. Additionally or alternatively, in the case where the driver stays sufficiently far away from the vehicle the loudness of the at least one component cannot be limited.

In accordance with the invention, the noise emission or the loudness of the at least one component is adjusted in a manner depending on the position of the at least one person. In particular, the loudness in the course of charging can be limited in a manner depending on the position of the driver outside the vehicle. By this means, the occurrence of an unpleasantly noisy vehicle during charging can be avoided.

The driver profits from a short charging-time, for instance by virtue of a high activation of the fan, and at the same time experiences a quiet, unobtrusive vehicle when he/she is within earshot. As a result, driver comfort during the charging process can be enhanced.

What is claimed is:

1. A device for controlling a drive-energy system of a hybrid or electric vehicle, comprising:
   a detection device configured to determine a position of at least one person relative to the hybrid or electric vehicle; and
   a control device configured to control at least one component of the hybrid or electric vehicle, the control device being configured to adjust a noise emission of the at least one component based on the determined position of the at least one person.

2. The device according to claim 1, wherein the control device is configured to adjust the noise emission of the at least one component during a rapid-charging process for charging a drive-energy storage device of the drive-energy system.

3. The device according to claim 1, wherein the control device is configured to reduce the noise emission of the at least one component when the detection device determines that the at least one person is staying in an interior space of the vehicle.

4. The device according to claim 1, wherein the control device is configured to reduce the noise emission of the at least one component when the detection device determines that the at least one person is staying outside the hybrid or electric vehicle and within a predetermined distance or ambient region from the hybrid or electric vehicle.

5. The device according to claim 1,
   wherein the detection device is configured to determine that the at least one person is moving away from the hybrid or electric vehicle when the at least one person stays at least one of in the passenger compartment of the hybrid or electric vehicle and within a predetermined distance from the hybrid or electric vehicle for less than a first predetermined period,
   wherein the detection device is configured to determine that the at least one person is remaining with the hybrid or electric vehicle at least for a certain time when the at least one person stays at least one of in the passenger compartment of the hybrid or electric vehicle and within the predetermined distance from the hybrid or electric vehicle for longer than a second predetermined period, and
   wherein the detection device is configured to determine that the at least one person is remaining permanently with the hybrid or electric vehicle when the at least one person stays at least one of in the passenger compartment of the hybrid or electric vehicle and within the predetermined distance from the hybrid or electric vehicle for longer than a third predetermined period, which is longer than the second predetermined period.

6. The device according to claim 5,
   wherein the control device is configured to reduce the noise emission of the at least one component when the detection device determines that the at least one person is remaining with the hybrid or electric vehicle, and
   wherein the control device is configured not to limit the noise emission of the at least one component at least temporarily when the detection device determines that the at least one person is remaining permanently with the hybrid or electric vehicle.

7. The device according to claim 1, wherein the detection device is configured to determine the position of the at least one person based on one or more of the following:
- a position of a car key;
- a position of a mobile terminal of the at least one person;
- a distance of the at least one person from the hybrid or electric vehicle;
- a position of the hybrid or electric vehicle; and
- a state of the central locking system of the hybrid or electric vehicle.

8. A hybrid or electric vehicle, including:
the device according to claim 1; and
the drive-energy system.

9. The hybrid or electric vehicle according to claim 8, wherein the at least one component of the hybrid or electric vehicle is selected from a group consisting of a refrigerant compressor and a fan.

10. A method for controlling a drive-energy system of a hybrid or electric vehicle, comprising:
- determining a position of at least one person relative to the hybrid or electric vehicle; and
- controlling at least one component of the hybrid or electric vehicle in such a manner that a noise emission of the at least one component is adjusted based on the position of the at least one person.

\* \* \* \* \*